(12) United States Patent
Kwon et al.

(10) Patent No.: US 8,976,745 B2
(45) Date of Patent: Mar. 10, 2015

(54) METHOD FOR TRANSMITTING A CONTROL SIGNAL IN A WIRELESS COMMUNICATION SYSTEM, AND APPARATUS FOR SAME

(75) Inventors: Yeong Hyeon Kwon, Anyang-si (KR); So Yeon Kim, Anyang-si (KR); Han Gyu Cho, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 13/265,540

(22) PCT Filed: Apr. 21, 2010

(86) PCT No.: PCT/KR2010/002483
§ 371 (c)(1),
(2), (4) Date: Oct. 20, 2011

(87) PCT Pub. No.: WO2010/123267
PCT Pub. Date: Oct. 28, 2010

(65) Prior Publication Data
US 2012/0039291 A1 Feb. 16, 2012

Related U.S. Application Data

(60) Provisional application No. 61/171,095, filed on Apr. 21, 2009.

(30) Foreign Application Priority Data

Apr. 20, 2010 (KR) .................. 10-2010-0036240

(51) Int. Cl.
*H04W 52/32* (2009.01)
*H04W 72/08* (2009.01)
(Continued)

(52) U.S. Cl.
CPC ............ *H04L 1/1671* (2013.01); *H04L 1/0026* (2013.01); *H04L 1/0027* (2013.01);
(Continued)

(58) Field of Classification Search
USPC .......................................... 370/329, 476, 345
See application file for complete search history.

(56) References Cited

U.S. PATENT DOCUMENTS

| | | | |
|---|---|---|---|
| 2010/0098012 A1* | 4/2010 | Bala et al. ............ | 370/329 |
| 2010/0246561 A1* | 9/2010 | Shin et al. ............ | 370/345 |

(Continued)

FOREIGN PATENT DOCUMENTS

| | | |
|---|---|---|
| KR | 1020030080165 | 10/2003 |
| KR | 1020070074438 | 7/2007 |

(Continued)

*Primary Examiner* — Kevin C Harper
*Assistant Examiner* — Derrick V Rose
(74) *Attorney, Agent, or Firm* — Lee, Hong, Degerman, Kang & Waimey

(57) ABSTRACT

The present invention discloses a method in which a terminal transmits an acknowledgement/negative acknowledgement (ACK/NACK) signal in a wireless communication system. In detail, the comprises the steps of allocating a first control channel resource to the ACK/NACK signal and a second control channel resource to a channel quality information (CQI) signal, determining the transmission power of the first control channel resource and the transmission power of the second control channel resource in accordance with a preset priority, and transmitting the ACK/NACK signal and the CQI signal to a base station using the control channel resources and the transmission powers corresponding thereto.

8 Claims, 14 Drawing Sheets

(51) Int. Cl.
*H04W 72/10* (2009.01)
*H04L 1/16* (2006.01)
*H04L 1/00* (2006.01)
*H04L 1/18* (2006.01)
*H04W 52/14* (2009.01)
*H04W 52/24* (2009.01)
*H04W 52/28* (2009.01)
*H04B 7/06* (2006.01)
*H04W 28/04* (2009.01)

(52) U.S. Cl.
CPC ............ *H04L1/1861* (2013.01); *H04L 1/1887* (2013.01); *H04W 52/146* (2013.01); *H04W 52/247* (2013.01); *H04W 52/281* (2013.01); *H04W 52/325* (2013.01); *H04B 7/0623* (2013.01); *H04B 7/0632* (2013.01); *H04W 28/04* (2013.01)
USPC ........................... 370/329; 370/476; 370/522

(56) References Cited

U.S. PATENT DOCUMENTS

2011/0142075 A1* 6/2011 Che et al. ...................... 370/476
2012/0307787 A1* 12/2012 Montojo et al. ............... 370/329

FOREIGN PATENT DOCUMENTS

| | | |
|---|---|---|
| KR | 1020080029713 | 4/2008 |
| KR | 1020090028461 | 3/2009 |

* cited by examiner

Structure of PUCCH format 1a and 1b (normal CP)

METHOD FOR TRANSMITTING A CONTROL SIGNAL IN A WIRELESS COMMUNICATION SYSTEM, AND APPARATUS FOR SAME

CROSS-REFERENCE TO RELATED APPLICATIONS

This application is National Stage filing under 35 U.S.C. 371 of International Application No. PCT/KR2010/002483, filed on Apr. 21, 2010, which claims the benefit of earlier filing date and right of priority to Korean Application Serial No. 10-2010-0036240, filed on Apr. 20, 2010 and also claims the benefit of U.S. Provisional Application Ser. No. 61/171,095, filed on Apr. 21, 2009, the contents of which are all hereby incorporated by reference herein in their entirety.

TECHNICAL FIELD

The present invention relates to a method for transmitting a control signal in a wireless communication system and an apparatus for the same, and more particularly, to a method for transmitting an acknowledgement/negative acknowledgement (ACK/NACK) signal from a user equipment in a wireless communication system to which carrier aggregation is applied, and an apparatus for the same.

BACKGROUND ART

A $3^{rd}$ generation partnership project long term evolution (3GPP LTE), LTE-Advanced (hereinafter, referred to as 'LTE-A') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110*a* and 110*b*, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of component carriers. For wider frequency bandwidth, the carrier aggregation aims to use a plurality of component carriers as one great logical frequency band. A bandwidth of each component carrier can be defined based on a bandwidth of a system block used in the LTE system. Each frequency block is transmitted using a component carrier.

DISCLOSURE

Technical Problem

An object of the present invention devised to solve the conventional problem is to provide a method and apparatus for transmitting a control signal, especially an acknowledgement/negative acknowledgement (ACK/NACK) signal from a user equipment to a base station in wireless communication system to which carrier aggregation is applied.

It will be appreciated by persons skilled in the art that the objects that could be achieved with the present invention are not limited to what have been particularly described hereinabove and the above and other objects that the present invention could achieve will be more clearly understood from the following detailed description.

Technical Solution

In an aspect of the present invention, a method for transmitting an acknowledgement/negative-acknowledgement (ACK/NACK) signal from a user equipment in a wireless communication system comprises the steps of allocating a first control channel resource to the ACK/NACK signal and a second control channel resource to a channel quality information (CQI) signal; determining the transmission power of the first control channel resource and the transmission power of the second control channel resource in accordance with a preset priority; and transmitting the ACK/NACK signal and the CQI signal to a base station using the control channel resources and the transmission powers corresponding to the control channel resources. In this case, the ACK/NACK signal and the CQI signal are transmitted through one antenna, and the preset priority is signaled from the base station.

In another aspect of the present invention, a method for transmitting an acknowledgement/negative-acknowledgement (ACK/NACK) signal from a user equipment in a wireless communication system comprises the steps of bundling a plurality of ACK/NACK signals in one ACK/NACK state information; allocating a first region of one control channel resource to a channel quality information (CQI) signal; allocating a second region of the one control channel resource to the one ACK/NACK state information; and transmitting the ACK/NACK state information and the CQI signal to a base station using the one control channel resource. Preferably, if the ACK/NACK state information is greater than the second region, the step of allocating the second region of one control channel resource further includes allocating an additional control channel resource to the ACK/NACK state information. Also, the first region corresponds to a payload included in a physical uplink control channel (PUCCH) format 2 type, and the second region corresponds to a plurality of reference symbols included in the PUCCH format 2 type.

In still another aspect of the present invention, a method for transmitting an acknowledgement/negative-acknowledgement (ACK/NACK) signal from a user equipment in a wireless communication system comprises the steps of allocating a part of a first region of one control channel resource to a dropped channel quality information (CQI) signal; allocating the other region of the first region and a second region of the one control channel resource to the ACK/NACK signal; and transmitting ACK/NACK state information and the dropped CQI signal to a base station using the one control channel resource. In this case, the first region corresponds to a payload included in a physical uplink control channel (PUCCH) format 2 type, and the second region corresponds to a plurality of reference symbols included in the PUCCH format 2 type. Also, the dropped CQI signal is either a selective CQI or a wideband CQI.

In further still another aspect of the present invention, a user equipment comprises a processor allocating a first control channel resource to an acknowledgement/negative acknowledgement (ACK/NACK) signal and a second control channel resource to a channel quality information (CQI) signal; and a transmitting module transmitting the ACK/NACK signal and the CQI signal to a base station using the control channel resources, wherein the processor determines the transmission power of the first control channel resource and the transmission power of the second control channel resource in accordance with a preset priority. In this case, the ACK/NACK signal and the CQI signal are transmitted through one antenna, and the preset priority is signaled from the base station.

In further still another aspect of the present invention, a user equipment comprises a processor bundling a plurality of acknowledgement/negative-acknowledgement (ACK/NACK) signals in one ACK/NACK state information, allocating a first region of one control channel resource to a channel quality information (CQI) signal, and allocating a second region of the one control channel resource to the one ACK/NACK state information; and a transmitting module transmitting the ACK/NACK state information and the CQI signal to a base station using the one control channel resource. Preferably, if the ACK/NACK state information is greater than the second region, the processor allocates an additional control channel resource to the ACK/NACK state information. Also, the first region corresponds to a payload included in a physical uplink control channel (PUCCH) format 2 type, and the second region corresponds to a plurality of reference symbols included in the PUCCH format 2 type.

In further still another aspect of the present invention, a user equipment comprises a processor allocating a part of a first region of one control channel resource to a dropped channel quality information (CQI) signal and allocating the other region of the first region and a second region of the one control channel resource to an acknowledgement/negative-acknowledgement (ACK/NACK) signal; and a transmitting module transmitting ACK/NACK state information and the dropped CQI signal to a base station using the one control channel resource. Preferably, the first region corresponds to a payload included in a physical uplink control channel (PUCCH) format 2 type, and the second region corresponds to a plurality of reference symbols included in the PUCCH format 2 type. Also, the dropped CQI signal is either a selective CQI or a wideband CQI.

Advantageous Effects

According to the embodiments of the present invention, a control signal, especially ACK/NACK signal can be transmitted efficiently from a user equipment to a base station in a wireless communication system to which carrier aggregation is applied.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of component carriers and uses at least one or more component carriers as a system block of a legacy system will be referred to as an evolved system or a wideband system. The component carrier used as a legacy system block has the same size as that of the system block of the legacy system. On the other hand, there is no limitation in sizes of the other component carriers. However, for system simplification, the sizes of the other component carriers may be determined based on the size of the system block of the legacy system. For example, the 3GPP LTE system and the 3GPP LTE-A system are evolved from the legacy system.

Based on the aforementioned definition, the 3GPP LTE system will herein be referred to as an LTE system or the legacy system. Also, a user equipment that supports the LTE system will be referred to as an LTE user equipment or a legacy user equipment. The 3GPP LTE-A system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system in this specification, the LTE system and the LTE-A system are only exemplary, and the embodiment of the present invention may be applied to all communication systems corresponding to the aforementioned definition.

Figure 1:
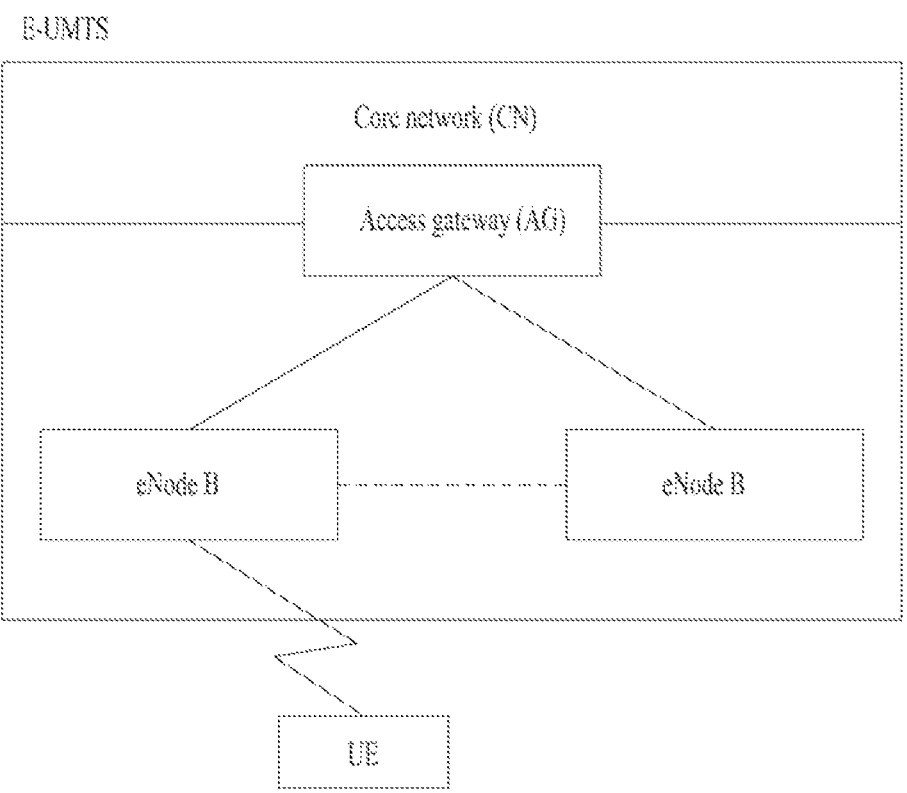
FIG. 1 is a diagram illustrating a network structure of an Evolved Universal Mobile Telecommunications System (E-UMTS), which is an example of a wireless communication system.
Figure 2:
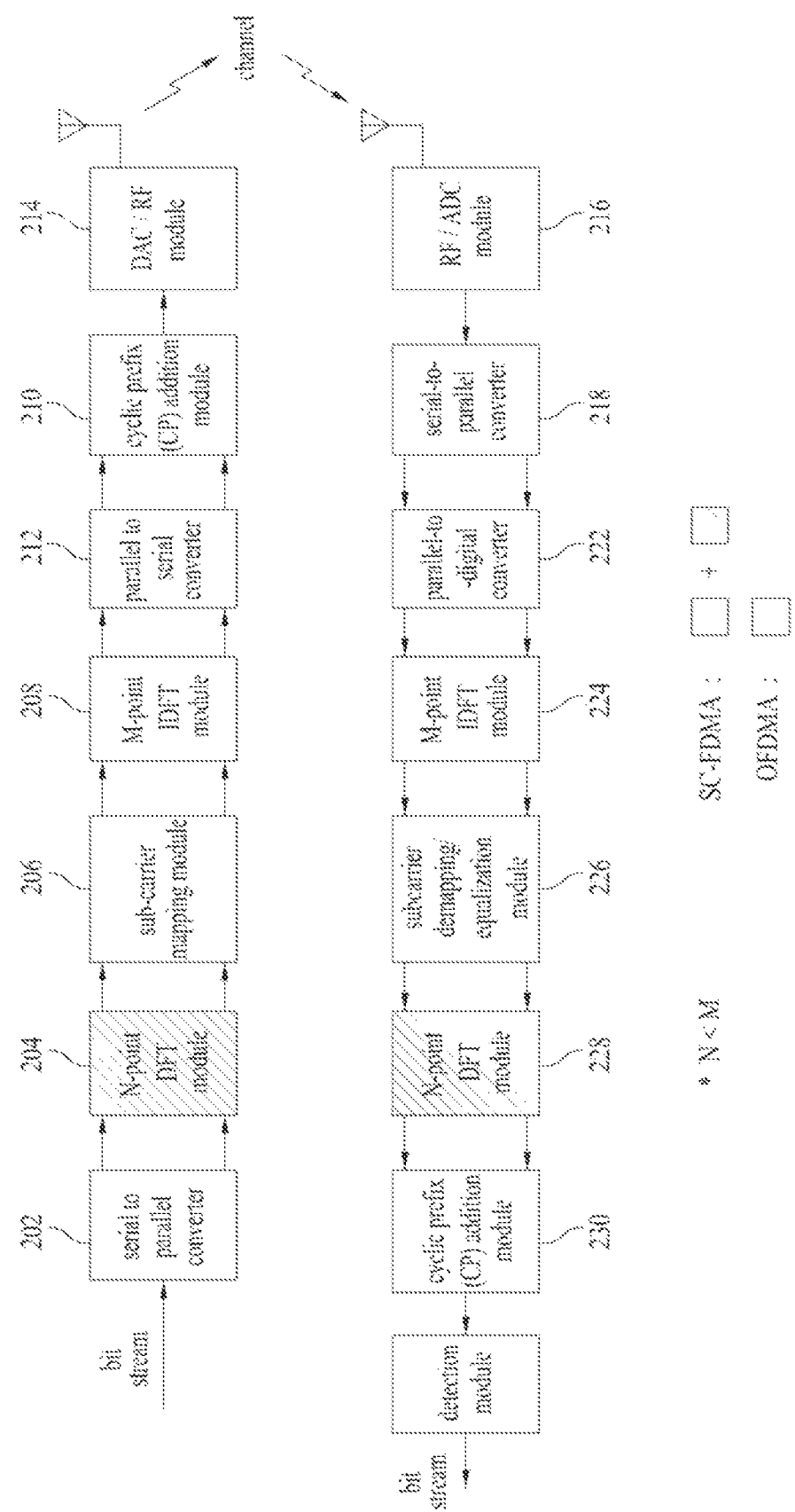
FIG. 2 is a diagram illustrating a transmitter and a receiver for OFDMA and SC-FDMA.

FIG. 2 is a block diagram illustrating a transmitter and a receiver for OFDMA and SC-FDMA. In an uplink, a transmitter 202~214 may be a part of a user equipment, and a receiver 216~230 may be a part of a base station. In a downlink, a transmitter may be a part of a base station, and a receiver may be a part of a user equipment.

Referring to FIG. 2, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams may be obtained by performing various signal processes, such as channel encoding, interleaving and scrambling, for a data block transferred from a medium access control (MAC) layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). Afterwards, the data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time domain sequences through M-point IDFT processing (208). Afterwards, in order to reduce inter-symbol interference (ISI) and inter-carrier interference (101), cyclic prefix is added to the time domain sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. On the other hand, the OFDMA receiver includes an RF/ADC (analog to digital converter) module 216, a serial-to-parallel converter 218, a cyclic prefix (CP) removing module 220, an M-point discrete fourier transform (DFT) module 222, a subcarrier demapping/equalization module 224, a parallel-to-digital converter 228, and a detection module 230. A signal processing procedure of the OFDMA receiver will be configured in reverse order of the OFDMA transmitter.

As compared with the OFDMA transmitter, the SC-FDMA transmitter additionally includes an N-point DFT module 204 prior to the subcarrier mapping module 206. The SC-FDMA transmitter may reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 226 after the subcarrier demapping module 224. A signal processing procedure of the SC-FDMA receiver will be configured in reverse order of the SC-FDMA transmitter.

Figure 3:
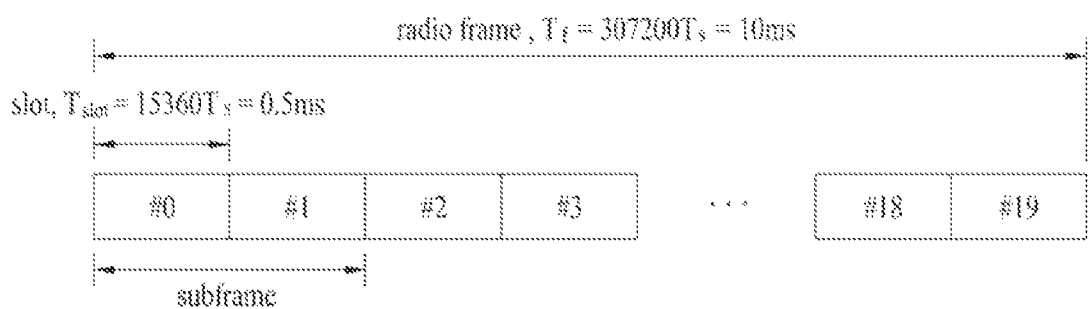
FIG. 3 is a diagram illustrating a structure of a radio frame used in an LTE system.

FIG. 3 is a diagram illustrating a structure of a radio frame used in the LTE system.

Referring to FIG. 3, the radio frame has a length of 10 ms (327200·$T_s$) and includes 10 subframes of an equal size. Each sub frame has a length of 1 ms and includes two slots. Each slot has a length of 0.5 ms (15360·$T_s$). In this case, $T_s$ represents a sampling time, and is expressed by $T_s=1/(15\ \text{kHz} \times 2048)=3.2552 \times 10^{-8}$ (about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers×seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot.

Figure 4:
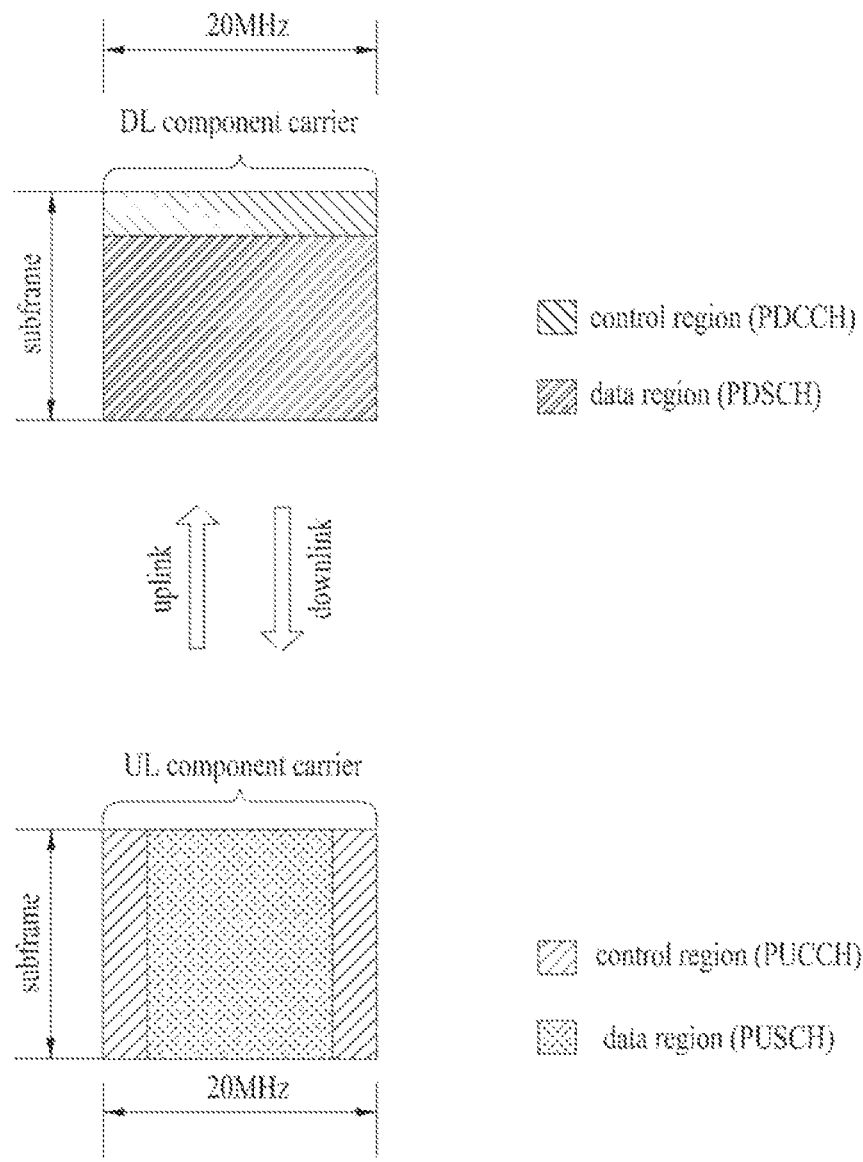
FIG. 4 is a diagram illustrating an example of communication performed under a single component carrier status.

FIG. 4 is a diagram illustrating an example of communication performed under a single component carrier status. FIG. 4 corresponds to a communication example of the LTE system. In a frequency division duplex (FDD) mode, data transmission and reception is performed through one downlink band and one uplink band corresponding to the downlink band. In more detail, in the FDD mode, the radio frame structure of FIG. 3 is used for downlink transmission or uplink transmission only. On the other hand, in a time division duplex (TDD) mode, the same frequency band is divided into a downlink interval and an uplink interval corresponding to the downlink interval in the time domain. In more detail, in the TDD mode, the radio frame structure of FIG. 3 is divided for downlink transmission and uplink transmission corresponding to the downlink transmission.

A method for performing HARQ (Hybrid Automatic Repeat and request) in a user equipment will be described with reference to FIG. 4. In the LTE system, control information (for example, scheduling information) of downlink data transmission of the base station is transferred to the user equipment through a downlink control channel established within a control region of a downlink subframe. The downlink control channel includes a physical downlink control channel (PDCCH). The user equipment may receive scheduled data through a downlink common channel indicated by scheduling information (for example, resources allocated with data, size of data, coding mode, redundancy version, etc.) after receiving the scheduling information through the control channel. The downlink common channel includes a physical uplink channel (PDSCH). Afterwards, the user equipment may transmit an acknowledgement signal (for example, HARQ ACK/NACK) in response to downlink data to the base station through the uplink control channel established within the control region of the uplink subframe. The uplink control channel includes a physical uplink control channel (PUCCH). For convenience, HARQ ACK/NACK will simply be expressed as ACK/NACK signal in this specification. The base station performs HARQ for downlink data indicated as NACK after receiving the ACK/NACK signal from the user equipment. If the base station transmits a plurality of downlink data to the user equipment, the HARQ process may be performed for each transport block corresponding to each of the downlink data.

Figure 5:
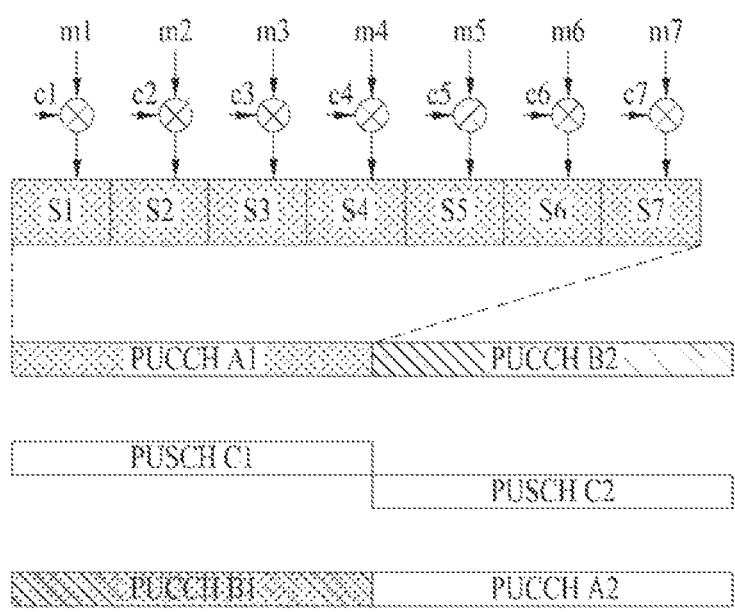
FIG. 5 is a diagram illustrating a structure of an uplink subframe used in an LTE system.

FIG. 5 is a diagram illustrating a structure of an uplink subframe used in an LTE system.

Referring to FIG. 5, the uplink subframe includes a plurality of slots (for example, two slots). The slot may include a different number of SC-FDMA symbols depending on a CP length. For example, in case of a normal CP, the slot may include seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBs) (for example, m=0, 1, 2, 3) located at both ends of the data region on the frequency axis, and is hopped using the slot as a boundary. The control information includes HARQ ACK/NACK, channel quality indicator (CQI), precoding matrix index (PMI), and rank index (RI). Also, the PUSCH and the PUCCH are not transmitted at the same time. The following Table 1 illustrates features PUCCH Format described in 3GPP TS 36.211 Release-8.

TABLE 1

| PUCCH format | Modulation scheme | Number of bits per subframe, $M_{bit}$ |
|---|---|---|
| 1 | N/A | N/A |
| 1a | BPSK | 1 |

TABLE 1-continued

| PUCCH format | Modulation scheme | Number of bits per subframe, $M_{bit}$ |
|---|---|---|
| 1b | QPSK | 2 |
| 2 | QPSK | 20 |
| 2a | QPSK + BPSK | 21 |
| 2b | QPSK + QPSK | 22 |

Figure 6:
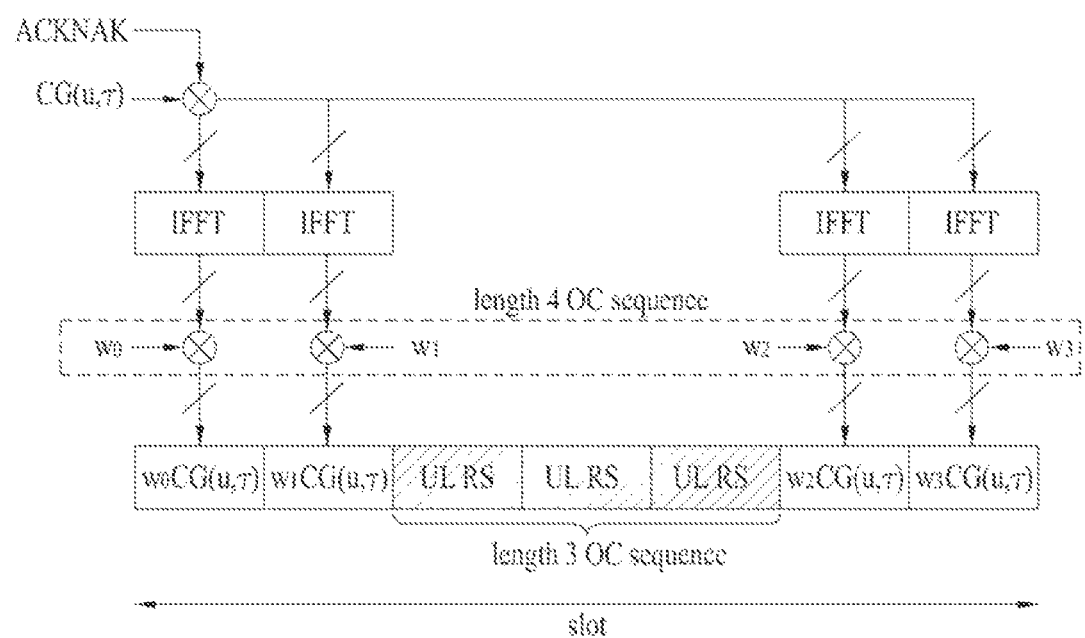
FIG. 6 is a diagram illustrating a structure of a PUCCH for ACK/NACK transmission.

FIG. 6 is a diagram illustrating a structure of a physical uplink control channel (PUCCH) for transmitting ACK/NACK.

Referring to FIG. 6, in case of a normal cyclic prefix (CP), a reference signal (UL RS) is carried in three continuous symbols located in the center of the slot, and control information (i.e., ACK/NACK signal) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using cyclic shift (CS) of sequences for frequency spreading and/or (quasi) orthogonal spreading codes for time spreading. For example, the ACK/NACK signals are identified using different cyclic shifts (CS) (frequency spreading) of computer generated constant amplitude zero auto correlation (CG-CAZAC) sequence and/or different Walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of (quasi)orthogonal codes for time spreading and cyclic shift of sequences for frequency spreading, and location of frequency-time resources (for example, resource block). Each PUCCH resource is indicated using a PUCCH (resource) index.

Figure 7:
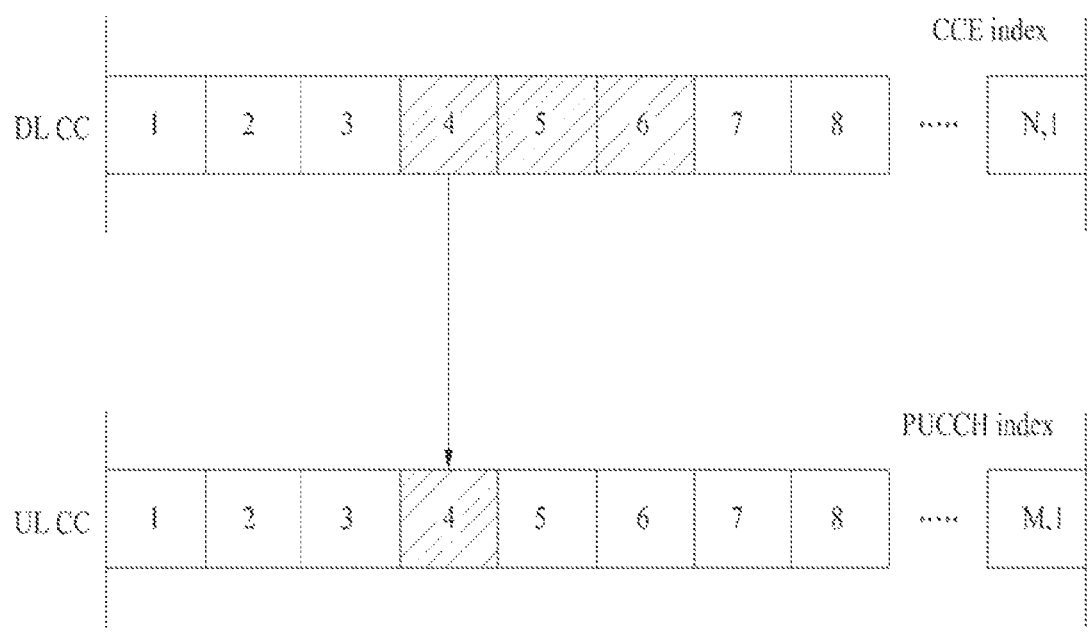
FIG. 7 is a diagram illustrating an example of determining PUCCH resources for ACK/NACK signal transmission.

FIG. 7 is a diagram illustrating an example of determining PUCCH resources for ACK/NACK signal transmission. In the LTE system, PUCCH resources for ACK/NACK are not previously allocated to each user equipment but used per timing point by a plurality of user equipments within a cell. In more detail, the PUCCH resources used for ACK/NACK transmission by the user equipment correspond to PDCCH carrying scheduling information of corresponding downlink data. In each downlink subframe, an entire region where PDCCH is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 7, each square block in a downlink component carrier (DL CC) represents a CCE, and each square block in an uplink component carrier (UL CC) represents a PUCCH resource. Each PUCCH index corresponds to a PUCCH resource for ACK/NACK. It is assumed that PDSCH information is transferred through a PDCCH that includes CCEs Nos. 4 to 6 as illustrated in FIG. 7. In this case, the user equipment transmits ACK/NACK through PUCCH No. 4 corresponding to CCE No. 4 which is the first CCE of the PDCCH. FIG. 6 illustrates that maximum M number of PUCCHs exist in the uplink component carrier (UL CC) when maximum N number of CCEs exist in the downlink component carrier (DL CC). Although N may be equal to M (N=M), M may be different from N, and mapping between CCEs and PUCCHs may be overlapped.

In more detail, in the LTE system, PUCCH resource index is defined as follows.

$$n^{(1)}{}_{PUCCH} = n_{CCE} + N^{(1)}{}_{PUCCH} \quad \text{[Equation 1]}$$

In this case, $n^{(1)}{}_{PUCCH}$ represents a PUCCH resource index for transmitting ACK/NACK, $N^{(1)}{}_{PUCCH}$ represents a signaling value transferred from an upper layer, and $n_{CCE}$ represents the smallest value of CCE indexes used for PDCCH transmission.

Figure 8:
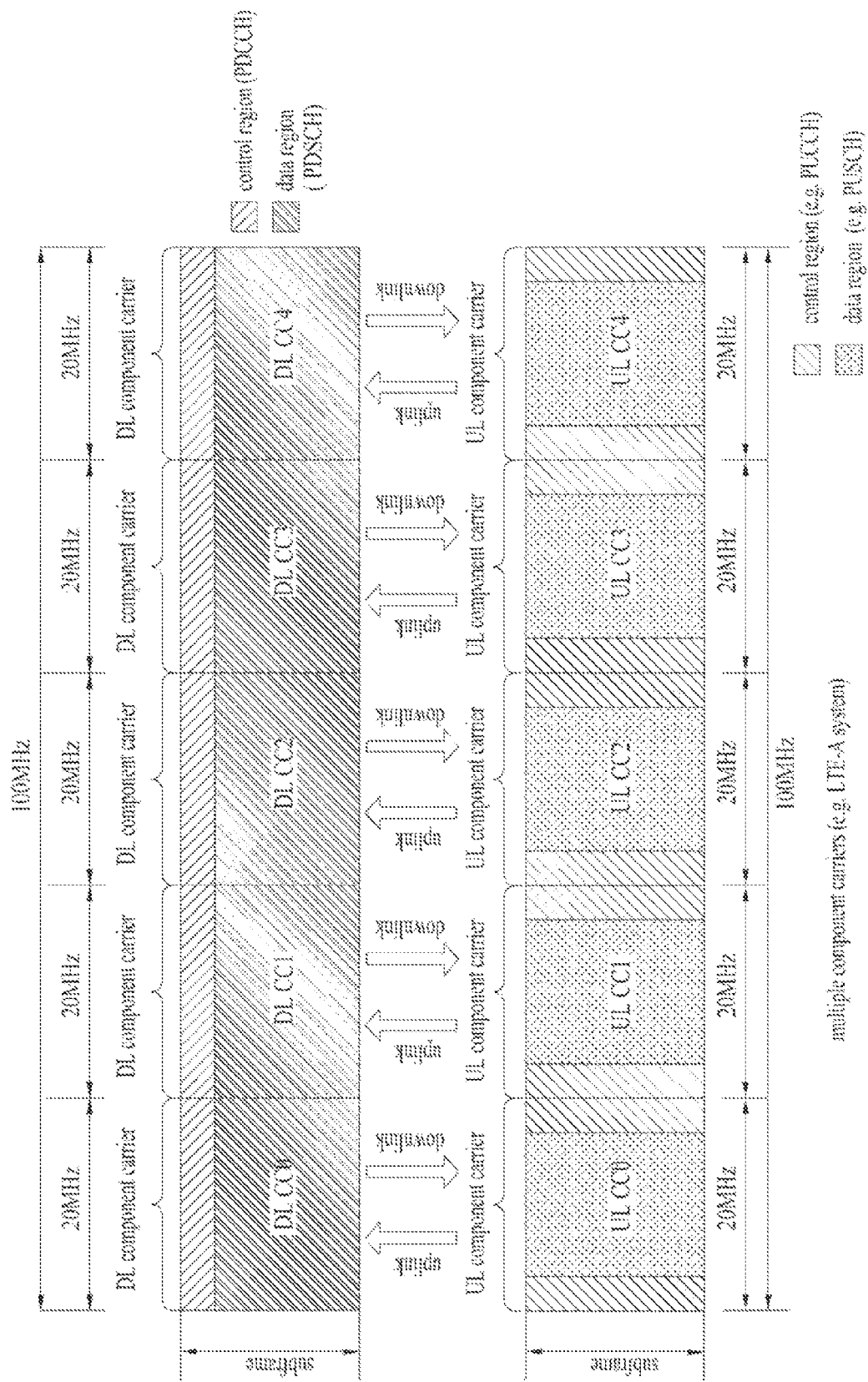
FIG. 8 is a diagram illustrating an example of communication performed under multiple component carriers.

FIG. 8 is a diagram illustrating an example of communication performed under multiple component carriers. FIG. 8 corresponds to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC).

Referring to FIG. 8, five component carriers (CCs) of 20 MHz are collected in the uplink/downlink to support a bandwidth of 100 MHz. The respective component carriers may adjoin each other in the frequency domain or not. The radio frame structure illustrated in FIG. 3 may be applied even in the case that multiple component carriers are used. However, since radio frame, subframe and slot are defined in a time unit, the base station and the user equipment may transmit and receive a signal through a plurality of component carriers on one subframe. FIG. 8 illustrates that a bandwidth of each uplink component carrier is the same as and symmetrical to that of each downlink component carrier. However, the bandwidths of the respective component carriers may be defined independently. For example, the bandwidths of the uplink component carriers may be configured as 5 MHz (UL CC0)+20 MHz (UL CC1)+20 MHz (UL CC2)+20 MHz (UL CC3)+5 MHz (UL CC4). Also, asymmetrical carrier aggregation where the number of uplink component carriers is different from the number of downlink component carriers may be configured. The asymmetrical carrier aggregation may occur due to a limit of available frequency bandwidth, or may be configured artificially by network establishment. Also, although an uplink signal and a downlink signal are transmitted through component carriers mapped with each other one to one, the component carrier through which a signal is actually transmitted may be varied depending on network establishment or signal type. For example, the component carrier through which a scheduling command is transmitted may be different from the component carrier through which data are transmitted in accordance with the scheduling command. Also, uplink/downlink control information may be transmitted through a specific uplink/downlink component carrier regardless of mapping between the component carriers.

If the number of uplink component carriers is, but not limited to, smaller than the number of downlink component carriers, the user equipment should transmit ACK/NACK for transmission of a plurality of downlink PDSCHs through smaller uplink PUCCHs. In particular, it may be set in such a manner that ACK/NACK for transmission of a plurality of downlink PDSCHs is transmitted through a specific uplink component carrier only. Also, even if the number of uplink component carriers is the same as the number of downlink component carriers, if the user equipment uses a MIMO (Multiple Input Multiple Output) mode or is operated in accordance with the TDD mode, it receives a plurality of transport blocks. In this case, the user equipment should transmit ACK/NACK signals for a plurality of transport blocks through the limited PUCCH resource.

Hereinafter, a method for simultaneously feeding back an ACK/NACK signal and a CQI signal as uplink control information from a user equipment in an LTE-A system will be described. In particular, a problem may occur in that the user equipment should use a limited transmission power for uplink transmission.

In the LTE system, the user equipment transmits the ACK/NACK signal together with the CQI signal by using a PUCCH format 2a or 2b. In this case, the ACK/NACK signal may be transmitted by applying a differential modulation scheme to two reference symbols per slot. According to this structure, the user equipment may simultaneously feed back the ACK/NACK signal and the CQI signal while maintaining single carrier characteristics. Also, in the LTE system, a method for feeding back an ACK/NACK signal only and dropping a CQI signal by using a PUCCH format 2a or 2b has been suggested. In this case, resources for transmitting the CQI signal are not used.

However, as a carrier aggregation scheme or a coordinated multi point (CoMP) transmission scheme is applied to the LTE-A system, much more ACK/NACK signals and CQI signals should be fed back. Accordingly, the current method for simultaneously feeding back an ACK/NACK signal and a CQI signal cannot be applied to the LTE-A system effectively. Also, the method for dropping a CQI signal has a problem in view of efficiency of resources. Accordingly, an efficient method for feeding back an ACK/NACK signal and a CQI signal, which can be applied to the LTE-A system, will be suggested.

First Embodiment

Figure 9:
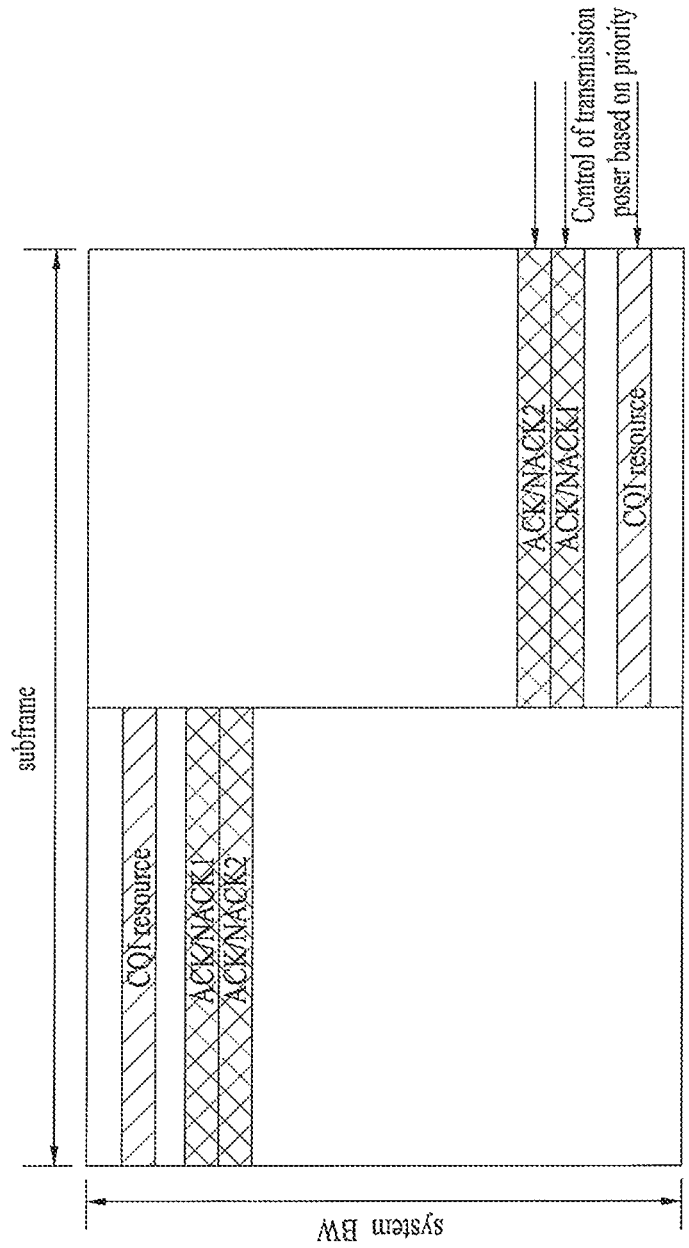
FIG. 9 is a diagram illustrating a method for simultaneously transmitting an ACK/NACK signal and a CQI signal in accordance with the first embodiment of the present invention.

FIG. 9 is a diagram illustrating a method for simultaneously transmitting an ACK/NACK signal and a CQI signal in accordance with the first embodiment of the present invention. According to the first embodiment of the present invention, for compatibility with the LTE system, the ACK/NACK signal and the CQI signal are transmitted to the base station by using control channel resources allocated to each signal.

In this case, since the ACK/NACK signal and the CQI signal are transmitted using different control channel resources through one antenna, single carrier characteristics may not be satisfied. Also, since there is limitation in the transmission power of the user equipment, quality of service (QoS) of each control channel may be deteriorated.

In order to prevent the QoS from being deteriorated, a power for transmitting each control channel should be controlled. In other words, a specific control channel having high priority may be transmitted using a power more than the allocated power, and a control channel having low priority may be transmitted using a low power by being more focused on reception of the base station than receiving quality. This transmission power control may be defined by an offset value that can be determined depending on a control channel format or a type of information transmitted through the control channel format.

For example, a control channel used to transmit the ACK/NACK signal may have high priority while a control channel used to transmit channel state information (CSI), a channel quality indicator (CQI) and a scheduling request (SR) may relatively have low priority. In this case, after the transmission power of the control channel used to transmit the ACK/NACK signal is first determined, the other power is preferably allocated to the transmission power of the channel used to transmit the other control signals.

Such allocation of the transmission power based on priority of the control channel is preferably implemented depending on signaling of the base station, and may be signaled through an upper layer or a broadcast channel. Also, if priority of the control channel is determined during cell establishment, signaling may not be required.

Second Embodiment

A method for transmitting an ACK/NACK signal and a CQI signal in combination through one or more specific control channels in accordance with the second embodiment of the present invention may be considered.

Figure 10:
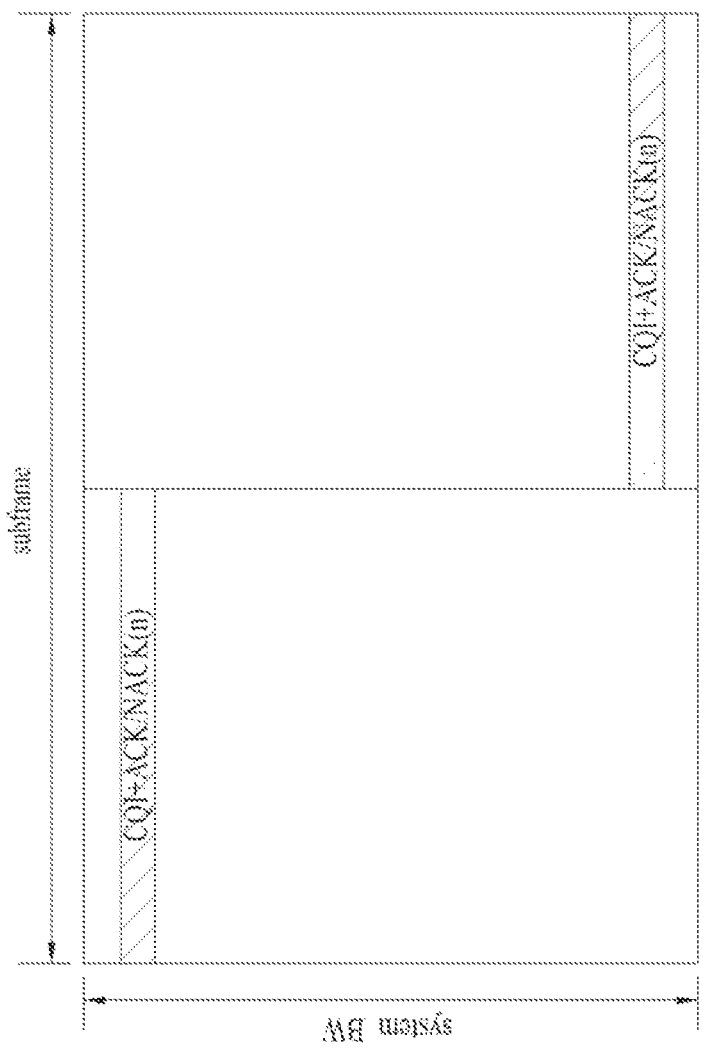
FIG. 10 is a diagram illustrating a resource allocation structure for transmitting an ACK/NACK signal and a CQI signal in combination in accordance with the second embodiment of the present invention.

FIG. 10 is a diagram illustrating a resource allocation structure for transmitting an ACK/NACK signal and a CQI signal in combination in accordance with the second embodiment of the present invention. In ACK/NACK (n) of FIG. 10, n indicates the number of ACK/NACK bits.

As described above, a method for feeding back different kinds of control information in combination by using one control information format is also applied to the LTE system according to the related art. For example, payload of the PUCCH format 2a or 2b in the LTE system corresponds to a region where the CQI signal is transmitted, and a differential modulation scheme is applied to a reference symbol so as to transmit the ACK/NACK signal. If a plurality of reference symbols subjected to the same channel response exist such as the case where a plurality of reference symbols exist in one slot or frequency hopping of a slot basis is not applied to one subframe, the method for feeding back an ACK/NACK signal and a CQI signal in combination may be applied to the user equipment of the LTE-A system.

In other words, a format of an uplink control channel which will be defined in the LTE-A system may exclude a frequency hopping scheme, for symbol interval extension or symbol pairing at different slots, the method for feeding back an ACK/NACK signal and a CQI signal in combination in accordance with the LTE system may be applied to the format of the uplink control channel. Also, for compatibility with the LTE system, the uplink control channel which will be defined in the LTE-A system is preferably defined in such a manner that it is added to the existing PUCCH format 2a or 2b.

Figure 11:
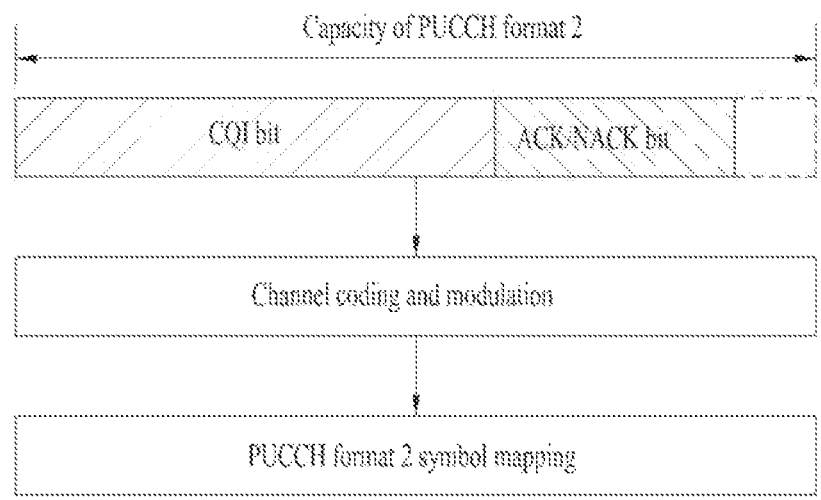
FIG. 11 is a diagram illustrating a method for transmitting an ACK/NACK signal and a CQI signal in combination in accordance with the second embodiment of the present invention.

FIG. 11 is a diagram illustrating a method for transmitting an ACK/NACK signal and a CQI signal in combination in accordance with the second embodiment of the present invention.

Referring to FIG. 11, the CQI signal and the ACK/NACK signal are configured by a PUCCH format 2 type. In this case, after the CQI signal is configured, the ACK/NACK signal is configured. Afterwards, symbol mapping is performed for the CQI signal and the ACK/NACK signal after channel coding and modulation schemes are performed for the signals, whereby the signals are fed back to the base station.

In more detail, if 1 bit or 2 bits are required for the LTE-A user equipment to transmit the ACK/NACK signal and PUCCH format 2 transmission is performed for the subframe to which the ACK/NACK signal should be transmitted, the ACK/NACK signal may be carried in the reference symbol in the same manner as the PUCCH format 2a or 2b of the related art and then may be fed back to the base station.

However, if the LTE-A user equipment requires more bits to transmit the ACK/NACK signal, it cannot feed back the ACK/NACK signal on the reference symbol. In this case, it is preferable that a plurality of ACK/NACK signals are fed back by being defined in a specific ACK/NACK state. To define the plurality of ACK/NACK signals in a specific ACK/NACK state, an ACK/NACK bundling scheme may be used.

For example, if a single user-space multiplexing scheme is used using two downlink component carriers, since the user equipment receives two codewords per component carrier, a total of four bits are required to feed back the ACK/NACK signal. However, if the ACK/NACK bundling scheme is applied to a space region or a frequency region, since a total of four bundled ACK/NACK states are defined, the ACK/NACK signal may be fed back by 2 bits only. Also, the ACK/NACK signal may be fed back by being carried on the reference signal. Bundling may be performed on a space or frequency axis. Likewise, bundling may be applied to ACK/NACK signals for a plurality of subframes on a time axis.

If bundled ACK/NACK signals are increased after bundling is performed, or if a resource for transmitting an ACK/NACK signal is not sufficient even though bundling has been performed, an uplink control channel format which will be defined in the LTE-A system may be defined in such a manner that a control channel resource is additionally allocated. The additional control channel resource may be used to transmit the number of scheduled and decoded component carriers or the number of DTX component carriers in addition to ACK/NACK state information such as the number of ACK signals. For example, if the additional control channel resource corresponds to a PUCCH format 1, the number of decoded component carriers may be fed back using the PUCCH format 1.

Figure 12:
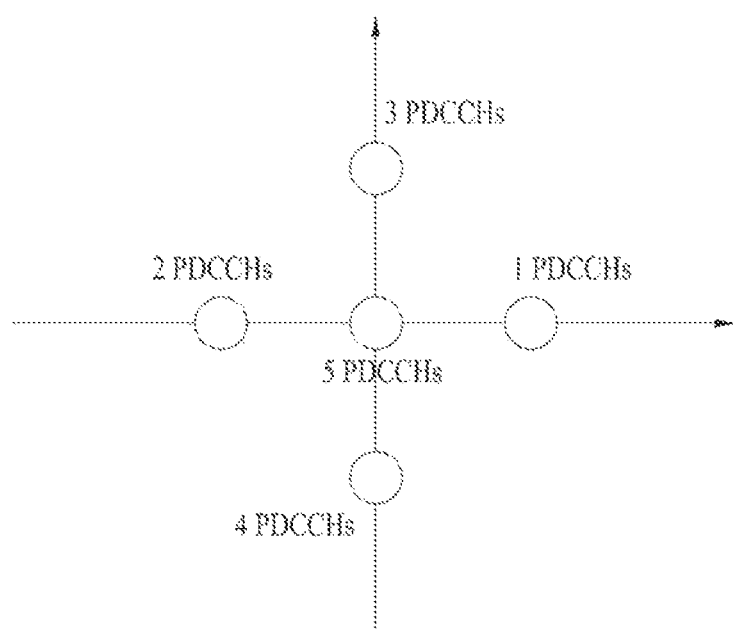
FIG. 12 is a diagram illustrating a method for feeding back the number of decoded component carriers if an additional channel resource is allocated in accordance with the second embodiment of the present invention.

FIG. 12 is a diagram illustrating a method for feeding back the number of decoded component carriers if an additional channel resource is allocated in accordance with the second embodiment of the present invention.

Referring to FIG. 12, since the number of downlink component carriers that can be scheduled in the LTE-A system is 5, the number of downlink component carriers may be expressed using QPSK modulation and DTX mode.

Also, in addition to additional allocation of a control channel resource, resources remaining after being allocated from payload of a PUCCH format 2a or 2b to the CQI may be used as those for transmitting increased ACK/NACK states. At this time, the location where ACK/NACK is allocated may be indicated explicitly in accordance with a given order in a corresponding component carrier, subframe or spatial region. In other words, if the number of DCIs received in the base station is different from that received in the user equipment, i.e., even though a decoding error of grant occurs, ACK/NACK information fed back from the user equipment should not have any error. To this end, when ACK/NACK information is carried in a region remaining after information such as CQI/RI is transmitted, the location where ACK/NACK information is carried is preferably determined based on each component carrier, subframe or antenna. If an additionally allocated resource region is sufficient, the ACK/NACK information may be transmitted in a DTX mode, for example, in three non-SM MIMO mode states or five SM-MIMO mode states.

When the ACK/NACK signal is transmitted to the channel for CQI transmission simultaneously with the CQI signal in the same manner as the aforementioned embodiment, corresponding information may be multiplexed on the payload and then transmitted through channel coding, symbol mapping and modulation.

Third Embodiment

If an ACK/NACK signal and a CQI signal should be fed back from one subframe but they cannot be transmitted to the base station at the same time due to the large sized CQI signal, a method for dropping the entire CQI signal or partially dropping the CQI signal in accordance with the third embodiment of the present invention may be considered. In this case, the CQI is random information including channel information, and may include a channel estimation state, rank information for definition of a MIMO mode, or precoding matrix information. Partial dropping of the CQI signal may indicate CQI of which information size is smaller than a normal CQI signal, and may include selective CQI or wideband CQI. Instead of partially dropping the CQI signal, transmission of a precoding matrix index may be considered. The user equipment may need to command the base station to perform dropping or deformation of the CQI signal. For example, the user equipment may include an indicator at a fixed location such as the last part or start part of a PUCCH format 2 payload, or may express such an indicator by using differential modulation of the reference symbol. The indicator serves to indicate a payload structure in the PUCCH format 2. If the indicator is located at a fixed location in the same manner as the present invention, the base station may exactly identify information on the received PUCCH format 2. Also, the indicator may have a size of 1 bit or more, and may simply be expressed as a bit indicator, or may be configured in such a manner that it includes parity information (for example, CRC) of a short size and a separate parity rule is applied to each payload.

Figure 13:
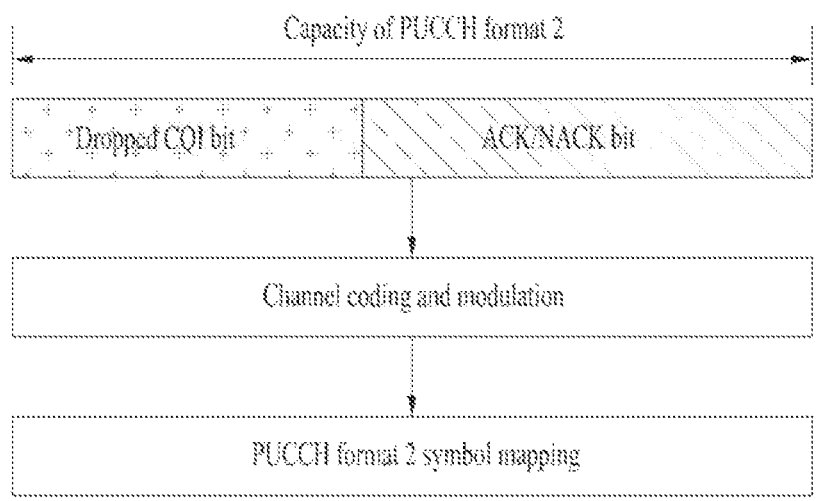
FIG. 13 is a diagram illustrating a method for transmitting an ACK/NACK signal and a CQI signal in accordance with the third embodiment of the present invention.

FIG. 13 is a diagram illustrating a method for transmitting an ACK/NACK signal and a CQI signal in accordance with the third embodiment of the present invention.

Referring to FIG. 13, a container of a PUCCH format 2 is configured by CQI bits and ACK/NACK bits, wherein all or some of the CQI bits may be dropped. After channel coding and modulation are performed, symbol mapping is performed, whereby the ACK/NACK signal and the CQI signal are fed back to the base station.

The CQI signal is used for channel estimation, and is not likely to cause a problem in data transmission and reception even in case of dropping. By contrast, since the ACK/NACK signal should be fed back during a HARQ process, priority is preferably given to the ACK/NACK signal not the CQI signal.

Resources to be allocated to the CQI signal may be reused due to dropping of the CQI signal. For example, resources for reuse may be allocated from the corresponding user equipment to the ACK/NACK signal, or may be used for other purpose of use. Since the base station does not allow resources, which are to be allocated to the CQI signal, to be used by the other user equipment, the corresponding user equipment may use the resources for reuse to transmit other control information.

Even though a new PUCCH format which will be defined in the LTE-A system cannot be used through the reused control channel resources (in particular, payload of PUCCH 2a or 2b), the ACK/NACK bits may be encoded to correspond to the reused control channel resources and carried in the payload. 0 or 1 may simply be padded in the other region of the payload or the ACK/NACK bits may be repeated therein.

If ACK/NACK information is transmitted, bit information or group of bit information for indicating the ACK/NACK information should be defined on the payload. In other words, specific bit information or group of bit information may indicate ACK/NACK or DTX information on specific component carrier/subframe/spatial stream. Different kinds of ACK/NACK information may be transmitted in a joint encoded type or a separate encoded type. Preferably, the location where information such as CQI/RI/PMI is transferred or the order of the information has a certain relation with the location or order where the ACK/NACK information is transferred. In this case, the base station may decode the corresponding channel without any error.

In particular, it is preferable that information corresponding to a maximum value at a specific point of the user equipment is transferred to a part that may be varied based on a decoding state at the specific point of the user equipment. In other words, if the base station cannot identify how many DCIs can be decoded by the user equipment, it is preferable that the base station directly notifies the user equipment of the number of the corresponding DCIs. Otherwise, it is preferable that the user equipment transmits the ACK/NACK information in accordance with the maximum number of available downlink component carriers.

Figure 14:
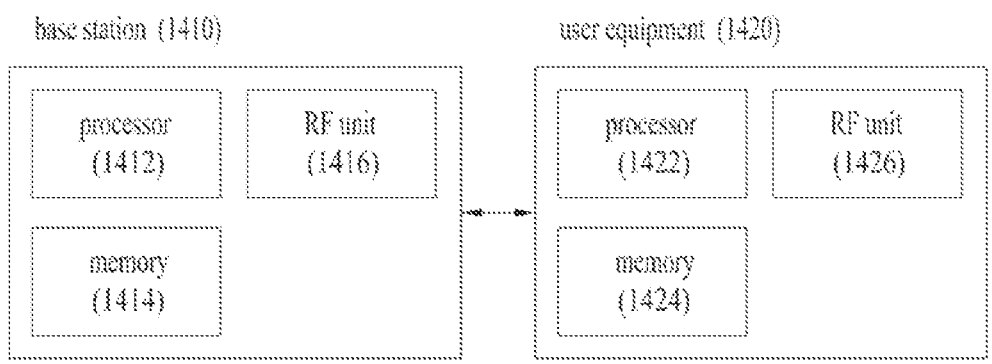
FIG. 14 is a diagram illustrating a base station and a user equipment, which can be applied to the embodiment of the present invention.

FIG. 14 is a diagram illustrating a base station and a user equipment, which can be applied to the embodiment of the present invention.

Referring to FIG. 14, a wireless communication system includes a base station (BS) 1410 and a user equipment (UE) 1420. In the downlink, the transmitter is a part of the base station 1410, and the receiver is a part of the user equipment 1420. In the uplink, the transmitter is a part of the user equipment 1420, and the receiver is a part of the base station 1410. The base station 1410 and/or the user equipment 1420 may have a single antenna or multiple antennas.

The user equipment 1420 includes a processor 1422, a memory 1424, and a radio frequency (RF) unit 1426. The processor 1422 may be configured to implement procedures and/or methods suggested in the present invention. The memory 1424 is connected with the processor 1422 and stores various kinds of information related to the operation of the processor 1422. The RF unit 1426 is connected with the processor 1422 and transmits and/or receives a radio signal. In other words, the RF unit 1426 includes a transmitting module and a receiving module.

In particular, the processor 1422 of the user equipment 1420 may feed back an ACK/NACK signal and a CQI signal to the base station 1410 by using control channel resources separately allocated to each signal. The processor 1422 first determines a transmission power of a control channel for transmitting the ACK/NACK signal and then allocates the other power to a transmission power of a channel for transmitting other control signal having low priority. This allocation of the transmission power based on the priority of the control channel may be set by signaling of the base station 1410.

Also, the processor 1422 of the user equipment 1420 may use a format of an uplink control channel, which will newly be defined in the LTE-A system, to transmit the ACK/NACK signal and the CQI signal in combination through one or more specific control channels. In this case, the format of the uplink control channel excludes a frequency hopping scheme, and is defined by being added to a PUCCH format 2a or 2b of the LTE system. In particular, since the LTE-A user equipment requires more bits to transmit the ACK/NACK signal, a plurality of ACK/NACK signals are subjected to bundling and fed back to the base station. If the bundled ACK/NACK states are increased after bundling is performed, or if a resource for transmitting the ACK/NACK signal is not sufficient even though bundling has been performed, a control channel resource is additionally allocated in an uplink control channel format which will be defined in the LTE-A system.

In the mean time, if the ACK/NACK signal and the CQI signal should be fed back at the same time but they cannot be transmitted to the base station at the same time due to the large sized CQI signal, the processor 1422 of the user equipment 1420 performs dropping for the entire CQI signal or performs partial dropping for the CQI signal. Resources to be allocated to the CQI signal may be allocated from the corresponding user equipment to the ACK/NACK signal due to dropping of the CQI signal, or may be used for other purpose of use.

The base station 1410 includes a processor 1412, a memory 1414, and a radio frequency (RF) unit 1416. The processor 1412 may be configured to implement procedures and/or methods suggested in the present invention. In more detail, if the user equipment 1420 feeds back the ACK/NACK signal and the CQI signal by using control channel resources separately allocated to each of the ACK/NACK signal and the CQI signal, it may signal the signals by determining priority of the signals. Moreover, the processor 1412 of the base station 1410 may additionally allocate a control channel resource to avoid shortage of the resource even in the case that the user equipment feeds back the ACK/NACK signal and the CQI signal in combination.

The memory 1414 of the base station 1410 is connected with the processor 1412 and stores various kinds of information related to the operation of the processor 1412. The RF unit 1416 is connected with the processor 1412 and transmits and/or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention may be applied to a method and apparatus for transmitting ACK/NACK information from a user equipment to a user equipment in a wireless communication system to which carrier aggregation is applied.

The invention claimed is:

1. A method for transmitting an acknowledgement/negative-acknowledgement (ACK/NACK) signal from a user equipment in a wireless communication system, the method comprising:
    bundling a plurality of ACK/NACK signals in one ACK/NACK state information;
    allocating a first region of one control channel resource to a channel quality information (CQI) signal;
    allocating a second region of the one control channel resource to the one ACK/NACK state information;
    transmitting the one ACK/NACK state information and the CQI signal to a base station using the one control channel resource; and
    allocating an additional control channel resource to the one ACK/NACK state information when a size of the one ACK/NACK state information is greater than a size of the second region,
    wherein the additional control channel resource is used to transmit a number of decoded component carriers,
    wherein the number of decoded component carriers is indicated by using Quadrature Phase Shift Keying (QPSK) modulation and a Discontinuous Transmission (DTX) mode, and
    wherein an allocated location of the one ACK/NACK state information is indicated explicitly in accordance with a spatial region for modulation.

2. The method according to claim 1, wherein the first region corresponds to a payload included in a physical uplink control channel (PUCCH) format 2 type, and the second region corresponds to a plurality of reference symbols included in the PUCCH format 2 type.

3. A method for transmitting an acknowledgement/negative-acknowledgement (ACK/NACK) signal from a user equipment in a wireless communication system, the method comprising:
    allocating a first part of a first region of one control channel resource to a dropped channel quality information (CQI) signal;
    allocating a second part of the first region and a second region of the one control channel resource to the ACK/NACK signal; and transmitting ACK/NACK state information and the dropped CQI signal to a base station using the one control channel resource according to a maximum number of available downlink component carriers, wherein the first region corresponds to a payload included in a physical uplink control channel (PUCCH) format 2 type and the second region corresponds to a plurality of reference symbols included in the PUCCH format 2 type, and wherein the payload comprises an indicator and bit information, the indicator indicating a payload structure in the PUCCH format 2 type, and the bit information indicating ACK/NACK or Discontinuous Transmission (DTX) information on a specific component carrier.

4. The method according to claim 3, wherein the dropped CQI signal is either a selective CQI or a wideband CQI.

5. A user equipment comprising:
a processor bundling a plurality of acknowledgement/negative-acknowledgement (ACK/NACK) signals in one ACK/NACK state information, allocating a first region of one control channel resource to a channel quality information (CQI) signal, and allocating a second region of the one control channel resource to the one ACK/NACK state information; and
a transmitting module transmitting the one ACK/NACK state information and the CQI signal to a base station using the one control channel resource,
wherein:
the processor further allocates an additional control channel resource to the one ACK/NACK state information when a size of the one ACK/NACK state information is greater than a size of the second region;
the additional control channel resource is used to transmit a number of decoded component carriers;
the number of decoded component carriers is indicated by using Quadrature Phase Shift Keying (QPSK) modulation and a Discontinuous Transmission (DTX) mode; and
an allocated location of the one ACK/NACK state information is indicated explicitly in accordance with a spatial region for modulation.

6. The user equipment according to claim 5, wherein the first region corresponds to a payload included in a physical uplink control channel (PUCCH) format 2 type and the second region corresponds to a plurality of reference symbols included in the PUCCH format 2 type.

7. A user equipment comprising:
a processor allocating a first part of a first region of one control channel resource to a dropped channel quality information (CQI) signal and allocating a second part of the first region and a second region of the one control channel resource to an acknowledgement/negative-acknowledgement (ACK/NACK) signal; and
a transmitting module transmitting ACK/NACK state information and the dropped CQI signal to a base station using the one control channel resource according to a maximum number of available downlink component carriers,
wherein the first region corresponds to a payload included in a physical uplink control channel (PUCCH) format 2 type and the second region corresponds to a plurality of reference symbols included in the PUCCH format 2 type, and
wherein the payload comprises an indicator and bit information, the indicator indicating a payload structure in the PUCCH format 2 type, and the bit information indicating ACK/NACK or Discontinuous Transmission (DTX) information on a specific component carrier.

8. The user equipment according to claim 7, wherein the dropped CQI signal is either a selective CQI or a wideband CQI.

* * * * *